US012626010B2

(12) United States Patent
Frohnapple

(10) Patent No.:  US 12,626,010 B2
(45) Date of Patent:  May 12, 2026

(54) SYSTEM AND METHOD FOR ELECTRONICALLY COMMUNICATING PROTECTED ACCESSIBLE USER DATA TO AN AUTHORIZED THIRD PARTY

(71) Applicant: Eric Frohnapple, Houston, TX (US)

(72) Inventor: Eric Frohnapple, Houston, TX (US)

( * ) Notice: Subject to any disclaimer, the term of this patent is extended or adjusted under 35 U.S.C. 154(b) by 67 days.

(21) Appl. No.: 18/440,862

(22) Filed: Feb. 13, 2024

(65) Prior Publication Data

US 2025/0258954 A1      Aug. 14, 2025

(51) Int. Cl.
*G06F 21/24*       (2006.01)
*G06F 21/00*       (2013.01)
*G06F 21/33*       (2013.01)
*G06F 21/60*       (2013.01)
*G06F 21/62*       (2013.01)

(52) U.S. Cl.
CPC .......... *G06F 21/6245* (2013.01); *G06F 21/33* (2013.01); *G06F 21/604* (2013.01); *G06F 21/6209* (2013.01); *G06F 2221/2111* (2013.01); *G06F 2221/2141* (2013.01)

(58) Field of Classification Search
CPC .... G06F 21/6245; G06F 21/33; G06F 21/604; G06F 21/6209
USPC .......................................................... 726/28
See application file for complete search history.

(56) References Cited

U.S. PATENT DOCUMENTS

| | | | | |
|---|---|---|---|---|
| 2015/0293915 A1 * | 10/2015 | Garg | ................... | G06F 16/5838 |
| | | | | 382/182 |
| 2016/0267264 A1 * | 9/2016 | Cannon | ................ | G06K 7/0091 |
| 2017/0006009 A1 * | 1/2017 | Hessler | ................ | G06F 21/316 |
| 2021/0273804 A1 * | 9/2021 | Khan | .................... | H04L 9/3234 |
| 2023/0214780 A1 * | 7/2023 | Fong | .................... | G06F 16/176 |
| | | | | 705/7.18 |

FOREIGN PATENT DOCUMENTS

| | | | | | |
|---|---|---|---|---|---|
| KR | 20220117259 A | * | 8/2022 | ............ | H04W 12/08 |

* cited by examiner

*Primary Examiner* — Haresh N Patel

(57)                ABSTRACT
A system and method for electronically communicating protected accessible data of a user to an authorized third party is described. The system allows the user to authorize access to the protected accessible data by the third party while preventing access to data that is not authorized. The system presents an interface that facilitates the user to provide the protected accessible data including a plurality of personal identification documents of the user. Upon receiving an access request from the authorized third party the user selects the plurality of personal identification documents by checking the boxes corresponding to the plurality of personal identification documents for viewing by the authorized third party. The system enables the user to provide an access code corresponding to the selected personal identification document facilitating the authorized third party to access the selected personal identification document.

17 Claims, 6 Drawing Sheets

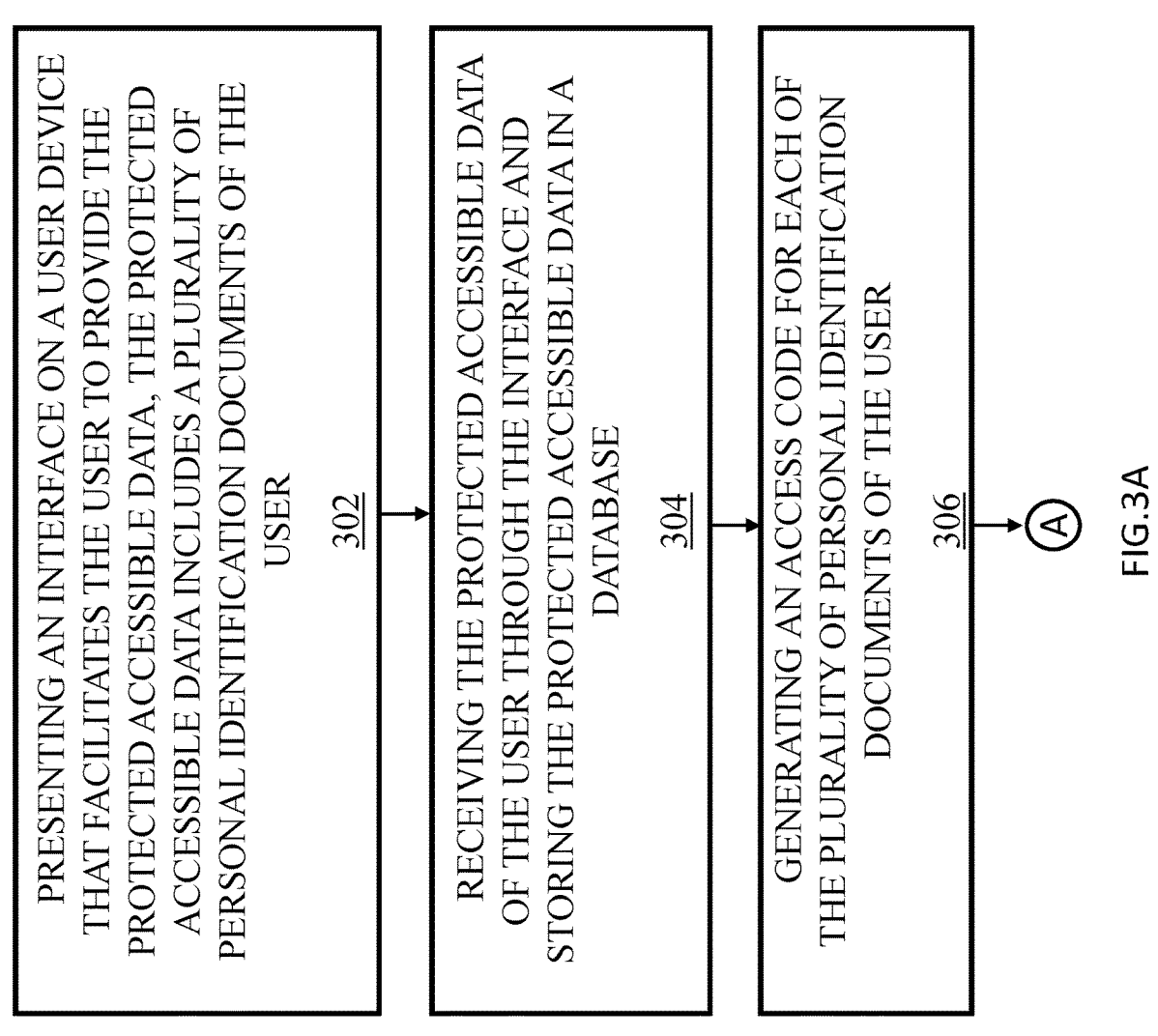

PRESENTING AN INTERFACE ON A USER DEVICE THAT FACILITATES THE USER TO PROVIDE THE PROTECTED ACCESSIBLE DATA, THE PROTECTED ACCESSIBLE DATA INCLUDES A PLURALITY OF PERSONAL IDENTIFICATION DOCUMENTS OF THE USER

302

RECEIVING THE PROTECTED ACCESSIBLE DATA OF THE USER THROUGH THE INTERFACE AND STORING THE PROTECTED ACCESSIBLE DATA IN A DATABASE

304

GENERATING AN ACCESS CODE FOR EACH OF THE PLURALITY OF PERSONAL IDENTIFICATION DOCUMENTS OF THE USER

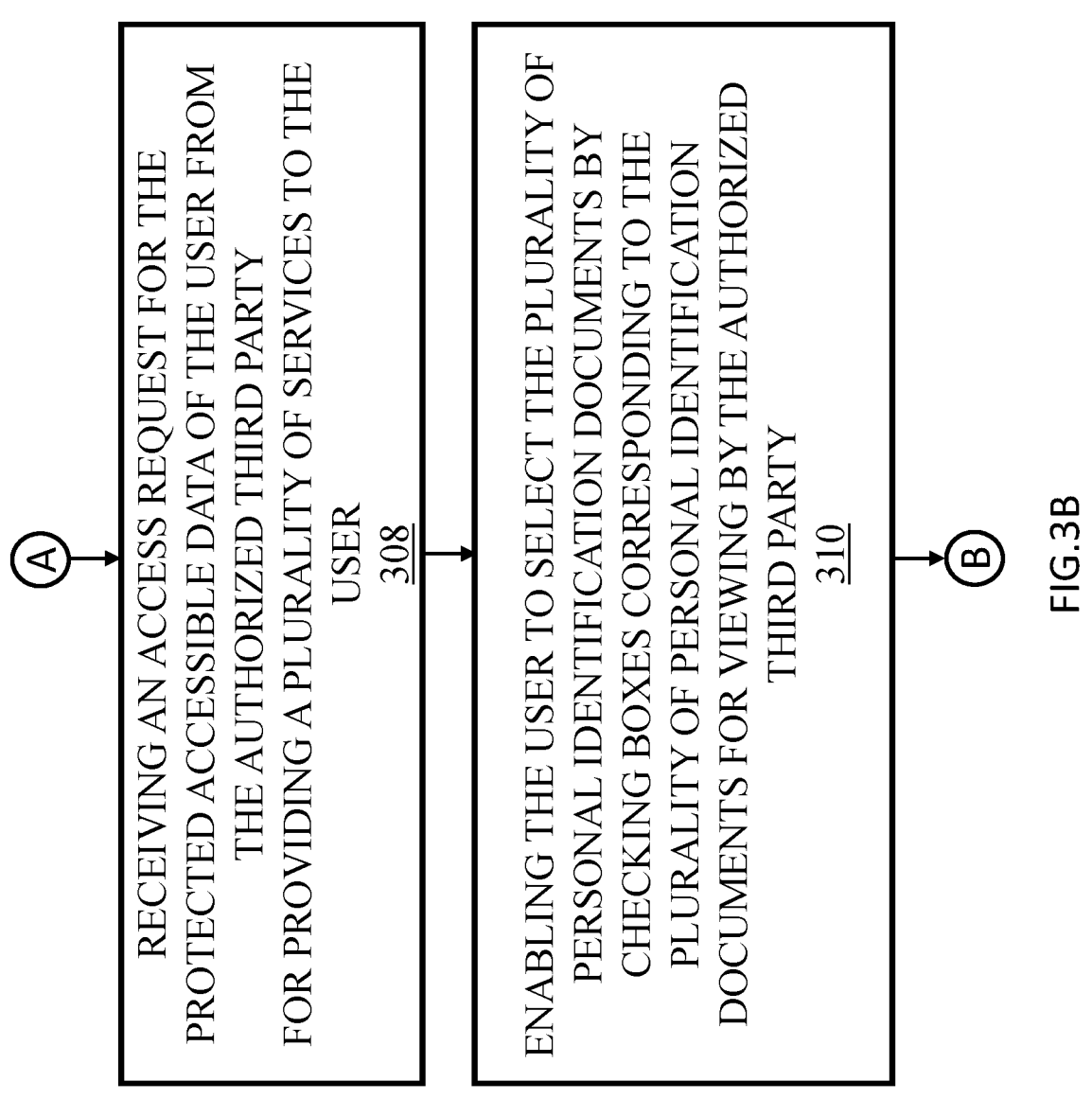

Ⓐ → RECEIVING AN ACCESS REQUEST FOR THE PROTECTED ACCESSIBLE DATA OF THE USER FROM THE AUTHORIZED THIRD PARTY FOR PROVIDING A PLURALITY OF SERVICES TO THE USER 308 → ENABLING THE USER TO SELECT THE PLURALITY OF PERSONAL IDENTIFICATION DOCUMENTS BY CHECKING BOXES CORRESPONDING TO THE PLURALITY OF PERSONAL IDENTIFICATION DOCUMENTS FOR VIEWING BY THE AUTHORIZED THIRD PARTY 310 → Ⓑ

FIG.3B

ENABLING THE USER TO PROVIDE THE ACCESS CODE CORRESPONDING TO THE SELECTED PERSONAL IDENTIFICATION DOCUMENT FACILITATING THE AUTHORIZED THIRD PARTY TO ACCESS THE SELECTED PERSONAL IDENTIFICATION DOCUMENT
312

SYSTEM AND METHOD FOR ELECTRONICALLY COMMUNICATING PROTECTED ACCESSIBLE USER DATA TO AN AUTHORIZED THIRD PARTY

CLAIM FOR PRIORITY

None.

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

This invention generally relates to the field of data security and document handling, more specifically, to a system and method for providing access on mobile devices to information required by third parties such as government representatives, law enforcement officials, health care providers, etc, while preventing access to information not authorized for other parties.

BACKGROUND OF THE INVENTION

The importance of data privacy in personal identification documents extends beyond individual concerns to encompass broader societal, legal, and security considerations. Implementing robust security measures and respecting privacy rights help mitigate the risks associated with the collection and storage of sensitive personal information. Personal identification documents, such as passports, driver's licenses, social security cards, vehicle registration documents and other documents, but not limited to_government-issued IDs, contain sensitive information that can be used to uniquely identify individuals. Ensuring the privacy and security of this data is crucial for several reasons including prevention of identity theft, protection of personal safety, privacy rights, financial security and legal and regulatory compliance. Government agencies often collect personal data from individuals for various reasons, and these purposes are generally tied to the fulfillment of their responsibilities and functions. Historically, personal data of a user was provided to agencies via a printed document. Increasingly, technology is enabling digital versions of evidence that is accessible on mobile devices. Although this has advantages such as reducing costs and impacts from printing, keeping information current, and reducing confusion caused by loss of documents remains a challenge. The risk of moving the personal data to mobile devices creates the potential for breach of privacy and identify theft. For example, when the mobile devices are unlocked to access the personal data, data not relevant to the approved personal data can be accessed without further authorization.

Accordingly, there remains a need to address the aforementioned technical drawbacks in providing a system and method to display information of protected accessible data of the user while securing and preventing access to non-disclosed data.

BRIEF SUMMARY OF THE INVENTION

The first aspect of the present invention provides a system for electronically communicating protected accessible data of a user to an authorized third party. The system includes a user device associated with the user. The system includes a processor communicatively connected with the user device through a network. The processor executes a set of instructions stored in a memory to perform the following: (i) presenting an interface on the user device that facilitates the user to provide the protected accessible data including a plurality of personal identification documents of the user, (ii) receiving the protected accessible data of the user through the interface and storing the protected accessible data in a database, (iii) generating an access code for each of the plurality of personal identification documents of the user, (iv) receiving an access request for the protected accessible data of the user from the authorized third party for providing a plurality of services to the user, (v) enabling the user to select the plurality of personal identification documents by checking boxes corresponding to the plurality of personal identification documents for viewing by the authorized third party, and (vi) enabling the user to provide the access code corresponding to the selected personal identification document facilitating the authorized third party to access the selected personal identification document through the user device.

In an embodiment, the processor is further configured to register the user by creating a user profile and generating a unique identifier associated with the user.

In another embodiment, the processor is further configured to verify user identification information utilizing certificates associated with the unique identifier of the user.

In yet another embodiment, the processor is further configured to provide to the user and/or authorized third party, the plurality of services upon verification of the identification information using encryption. The access to the plurality of services is limited based on the user profile.

In yet another embodiment, the interface is customized based on a region associated with a location of the user. The region determines a type of the protected accessible data to display in the interface for a respective third party.

In yet another embodiment, the processor is further configured to store a history of user transactions with the authorized third party in the database.

In yet another embodiment, the interface enables the user to define settings including duration of access, number of uses for each granted access code and potentially accessible protected accessible data.

In yet another embodiment, the protected accessible data is stored in a cloud server. The user device associated with the user is communicatively connected with the cloud server.

In yet another embodiment, the plurality of personal identification documents of the user includes, but is not limited to driver's license, motor vehicle insurance document, registration document of a motor vehicle, passport or travel visas, domestic or international travel documents, immunization records, identity verification documents, voter registration document, health insurance document, age verification documents and rental contracts.

The second aspect of the present invention provides a method for electronically communicating protected accessible data of a user to an authorized third party. The method includes, (i) presenting an interface on a user device that facilitates the user to provide the protected accessible data including a plurality of personal identification documents of the user, (ii) receiving the protected accessible data of the user through the interface and storing the protected accessible data in a database, (iii) generating an access code for each of the plurality of personal identification documents of the user, (iv) receiving an access request for the protected accessible data of the user from the authorized third party for providing a plurality of services to the user, (v) enabling the user to select the plurality of personal identification documents by checking boxes corresponding to the plurality of personal identification documents for viewing by the authorized third party and (vi) enabling the user to provide the access code corresponding to the selected personal identification document facilitating the authorized third party to access the selected personal identification document through the user device.

In an embodiment, the method further includes registering the user by creating a user profile and generating a unique identifier associated with the user.

In another embodiment, the method further includes verifying user identification information utilizing certificates associated with the unique identifier of the user.

In yet another embodiment, the method further includes providing to the user and/or authorized third party, the plurality of services upon verification of the identification information using encryption. Access to the plurality of services is limited based on the user profile.

In yet another embodiment, the interface is customized based on a region associated with a location of the user. The region determines a type of the protected accessible data to display in the interface for a respective third party.

In yet another embodiment, the method further includes storing a history of user transactions with the authorized third party in the database.

In yet another embodiment, the interface enables the user to define settings including duration of access, number of uses for each granted access code and potentially accessible protected accessible data.

In yet another embodiment, the protected accessible data is stored in a cloud server. The user device associated with the user is communicatively connected with the cloud server.

In yet another embodiment, the plurality of personal identification documents of the user includes, but is not limited to driver's license, motor vehicle insurance document, registration document of a motor vehicle, passport or travel visas, domestic or international travel documents, immunization records, identity verification documents, voter registration document, health insurance document, age verification documents and rental contracts.

The third aspect of the present invention provides one or more non-transitory computer-readable storage mediums for electronically communicating protected accessible user data to an authorized third party, the one or more non-transitory computer-readable storage mediums storing computer-executable instructions for controlling one or more computing systems to (i) present an interface on a user device that facilitates the user to provide the protected accessible data including a plurality of personal identification documents of the user, (ii) receive the protected accessible data of the user through the interface and store the protected accessible data in a database, (iii) generate an access code for each of the plurality of personal identification documents of the user, (iv) receive an access request for the protected accessible data of the user from the authorized third party for providing a plurality of services to the user, (v) enable the user to select the plurality of personal identification documents by checking the boxes corresponding to the plurality of personal identification documents for viewing by the authorized third party, and (vi) enable the user to provide the access code corresponding to the selected personal identification document facilitating the authorized third party to access the selected personal identification document through the user device.

These and other objects, features, and advantages of the present invention will become more readily apparent from the attached drawings and the detailed description of the preferred embodiments, which follow.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly:

FIGS. 3A-3C are flow diagrams that illustrate a method for electronically communicating protected accessible user data to an authorized third party according to various embodiments of the present invention.

Like reference numerals refer to like parts throughout the several views of the drawings.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "include" and/or "including," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims. A system and method for electronically communicating protected accessible user data to an authorized third party is discussed herein. In the following description, for purposes of explanation, numerous specific details are set forth in order to provide a thorough understanding of the present invention. It will be evident, however, to one skilled in the art that the present invention may be practiced without these specific details. The present disclosure is to be considered as an exemplification of the invention and is not intended to limit the invention to the specific embodiments illustrated by the figures or description below. The present invention will now be described by referencing the appended figures representing preferred embodiments.

Figure 1:
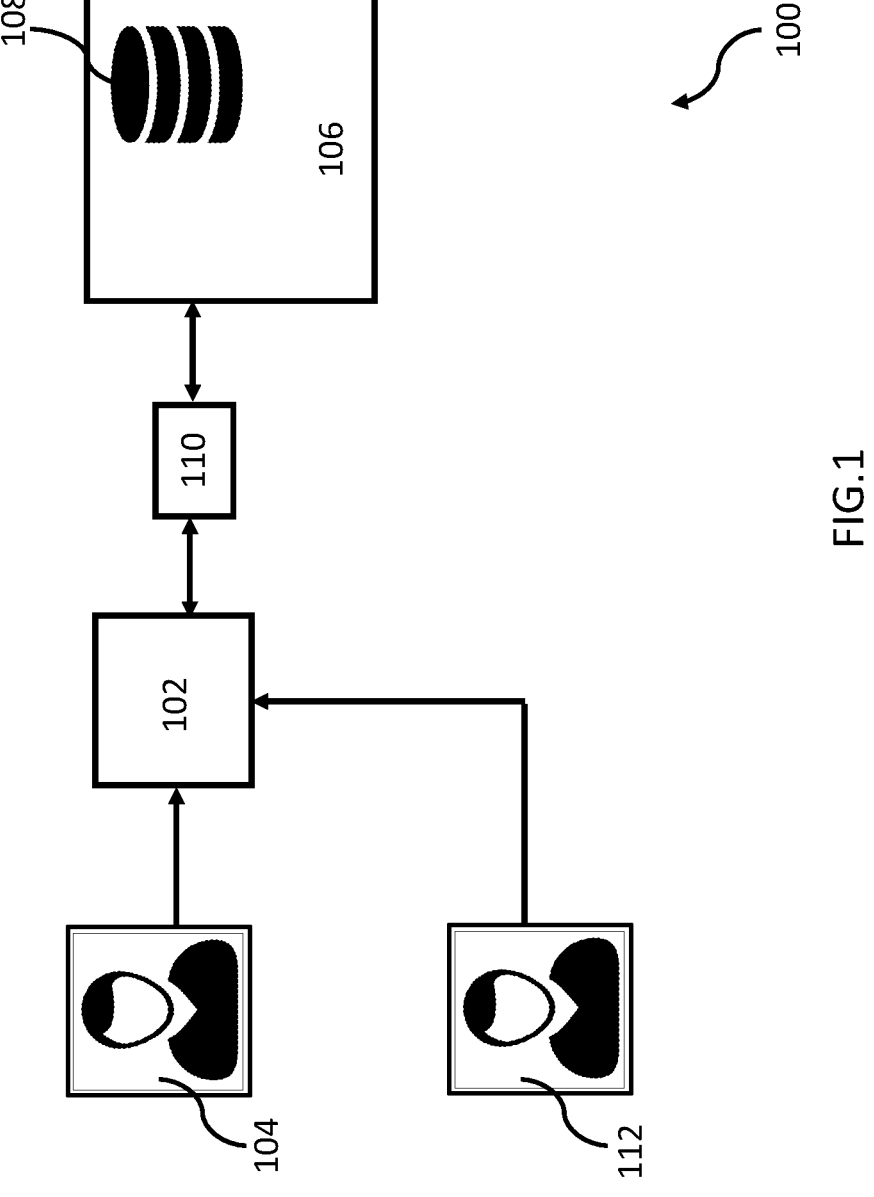
FIG. 1 illustrates a system for electronically communicating protected accessible user data to an authorized third party according to various embodiments of the present invention.

FIG. 1 illustrates a system for electronically communicating protected accessible user data to an authorized third party according to various embodiments of the present invention. The system 100 includes a user device 102 associated with the user 104, a processor 106, a database 108, a network 110 and the authorized third party 112. The processor 106 is communicatively connected with the user device 102 through the network 110. The processor 106 is configured to present an interface on the user device 102. The interface facilitates the user to provide the protected accessible data. The protected accessible data includes a plurality of personal identification documents of the user. The plurality of personal identification documents of the user includes, but is not limited to, driver's license, motor vehicle insurance document, registration document of a motor vehicle, passport or travel visas, domestic or international travel documents, immunization records, identity verification documents, voter registration document, health insurance document, age verification documents and rental contracts. The protected accessible data may apply to the entire personal identification documents of the user 104. In an embodiment, the protected accessible data of the user 104 is obtained through an external device. The processor 106 is configured to receive the protected accessible data of the user 104 through the interface and stores the protected accessible data in the database 108. The processor 106 is configured to generating an access code for each of the plurality of personal identification documents of the user 104. The processor 106 is configured to receive an access request for the protected accessible data of the user 104 from the authorized third party 112 for providing a plurality of services to the user 104. The processor 106 enables the user 104 to select the plurality of personal identification documents by checking the boxes corresponding to the plurality of personal identification documents for viewing by the authorized third party 112. The processor 106 is configured to enable the user 104 to provide the access code corresponding to the selected personal identification document facilitating the authorized third party 112 to access the selected personal identification document. The access code is limited by time and number of access uses, based on the settings selected by the user 104. The authorized third party 112 is enabled to view only the selected personal identification documents of the user 104 while preventing access to data that is not authorized. Unauthorized data may include, but not limited to geolocation data, email, text messages, social media, pictures & photo albums, location tracking and history, shopping and purchasing records, voicemail, tracking data such as cookies, and any other personal data. The system 100 is agnostic to device hardware, operating system, or other software. After the selected personal identification documents are accessed by the authorized third party 112, the user device 102 is reset and requires the user 104 to authenticate before any features are available.

The processor 106 is further configured to register the user 104 by creating a user profile and generating a unique identifier associated with the user 104. The processor 106 is further configured to verify the user identification information utilizing certificates associated with the unique identifier of the user 104. In an embodiment, the user verification is performed by a central registration system. The processor 106 is further configured to provide the plurality of services to the user 104 and/or authorized third party 112 upon verification of the identification information using encryption. The access to the plurality of services is limited based on the user profile. The interface is customized based on a region associated with a location of the user 104. The region determines a type of the protected accessible data to display in the interface for a respective third party 112. The processor 106 is further configured to track the protected accessible data displayed on the interface and store a history of user transactions in the database 108 with the authorized third party 112. The interface enables the user 104 to define settings including duration of access, number of uses for each granted access code and potentially accessible protected accessible data. In an embodiment, the protected accessible data is stored in a cloud server. The system 100 facilitates launching a digital vault storing the protected accessible data that can be accessed by the user 104 from the user device 102 through an application. The user 104 grants access to the protected accessible data upon launching the digital vault. The user 104 unlocks the user device 102 and provides the access code to the authorized third party 112. Upon exiting the app or restarting the user device 102 by the user 104, the protected accessible data is secured as designated by the criteria selected by the user 104. In an embodiment, the system 100 implements multi-factor authentication to enhance security. In some embodiments, the authorized third party 112 may send an access request to the user device 102 for accessing the protected accessible data of the user from a second device associated with the authorized third party for providing a plurality of services to the user.

Figure 2:
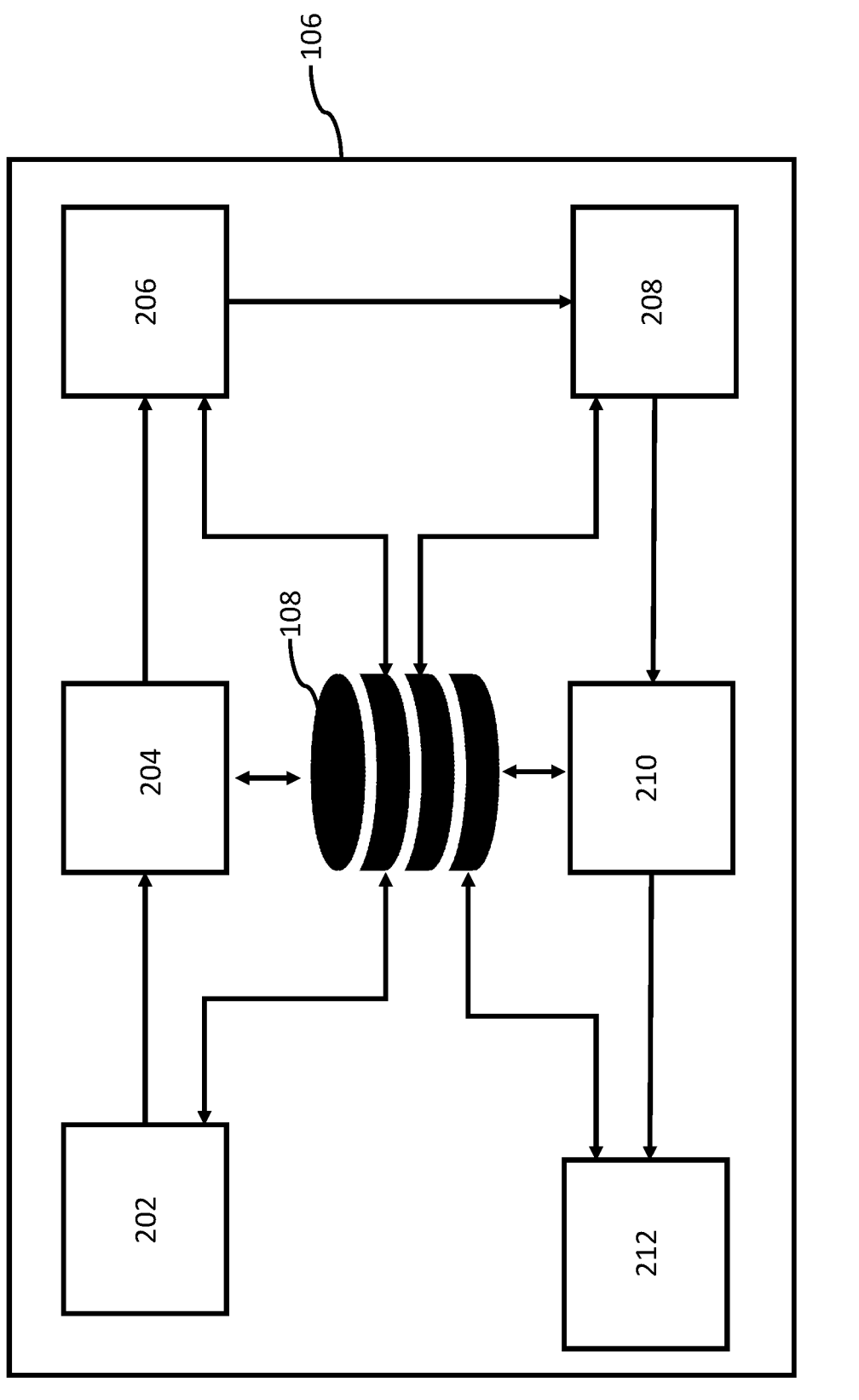
FIG. 2 illustrates various modules of the processor of FIG. 1 according to various embodiments of the present invention.

FIG. 2 illustrates various modules of the processor of FIG. 1 according to various embodiments of the present invention. The processor 106 includes the database 108, an interface presenting module 202, a protected accessible data receiving module 204, an access code generation module 206, an access request receiving module 208, a selection module 210, and a third party access authorization module 212. The interface presenting module 202 is configured to present the interface on the user device 102 that facilitates the user 104 to provide the protected accessible data. The protected accessible data includes a plurality of personal identification documents of the user 104. The protected accessible data receiving module 204 is configured to receive the protected accessible data of the user 104 through the interface and store the protected accessible data in the database 108. The access code generation module 206 is configured to generate an access code for each of the plurality of personal identification documents of the user 104. The access request receiving module 208 is configured to receive an access request for the protected accessible data of the user 104 from the authorized third party 112 for providing a plurality of services to the user 104, selection module 210 is configured to enable the user 104 to select the plurality of personal identification documents by checking the boxes corresponding to the plurality of personal identification documents for viewing by the authorized third party 112. The third party access authorization module 212 is configured to enable the user 104 to provide the access code corresponding to the selected personal identification document facilitating the authorized third party 112 to access the selected personal identification document.

Figure 3C:
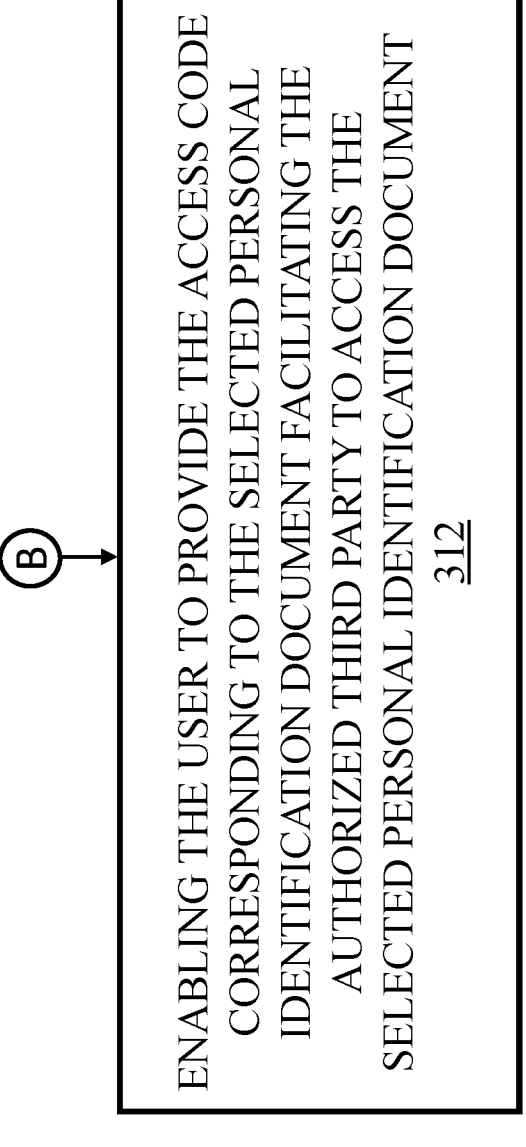

FIGS. 3A-3C are flow diagrams that illustrate a method for electronically communicating protected accessible user data to an authorized third party according to various embodiments of the present invention. At step 302, the method includes presenting an interface on a user device that facilitates the user to provide the protected accessible data. The protected accessible data includes a plurality of personal identification documents of the user. At step 304, the method includes receiving the protected accessible data of the user through the interface and storing the protected accessible data in a database. At step 306, the method includes generating an access code for each of the plurality of personal identification documents of the user. At step 308, the method includes receiving an access request for the protected accessible data of the user from the authorized third party for providing a plurality of services to the user. At step 310, the method includes enabling the user to select the plurality of personal identification documents by checking boxes corresponding to the plurality of personal identification documents for viewing by the authorized third party. At step 312, the method includes enabling the user to provide the access code corresponding to the selected personal identification document facilitating the authorized third party to access the selected personal identification document.

Figure 4:
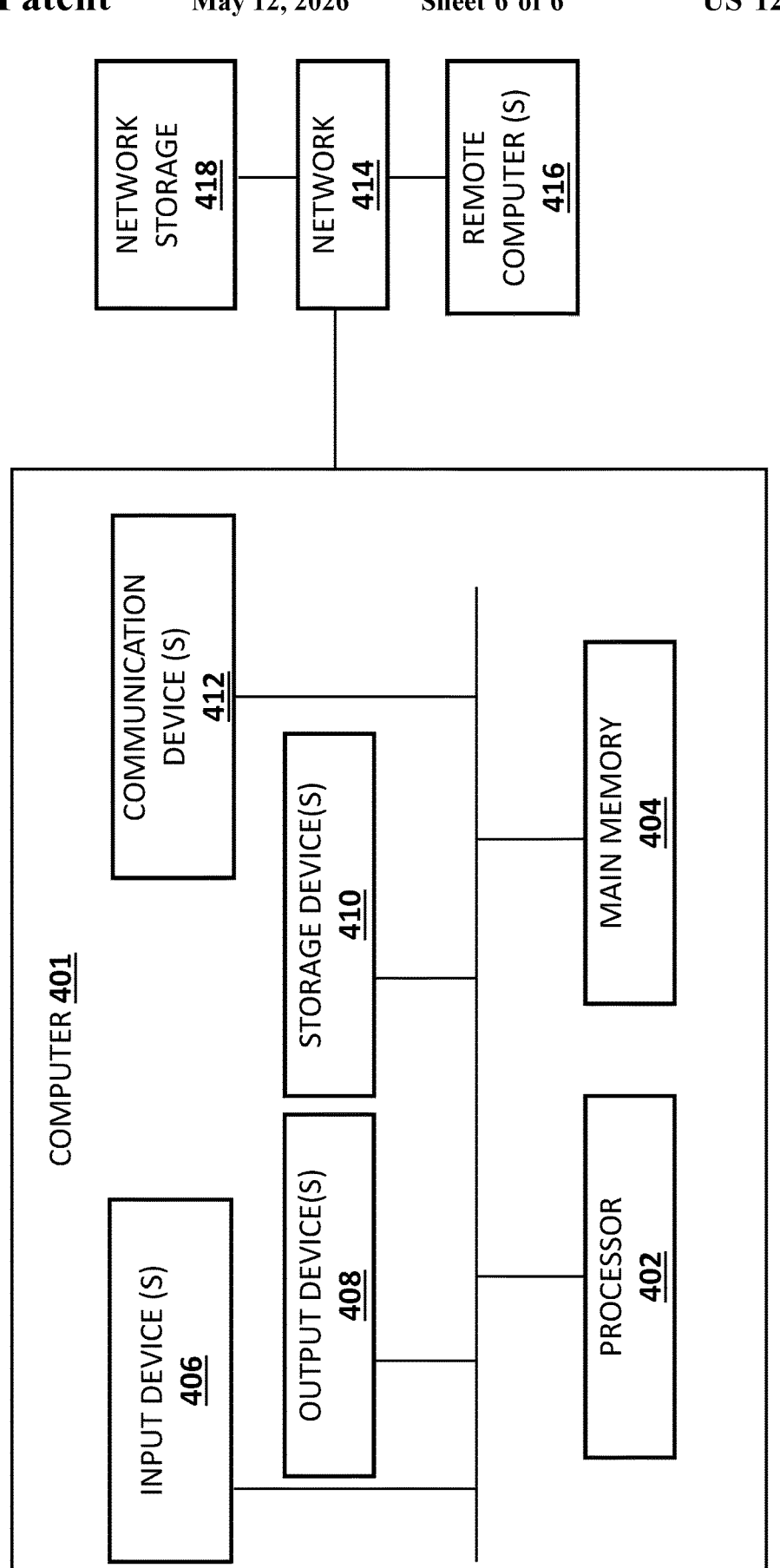
FIG. 4 illustrates a general computer architecture that can be appropriately configured to implement components disclosed in accordance with various embodiments of the present invention.

FIG. 4 illustrates a general computer architecture that can be appropriately configured to implement components disclosed in accordance with various embodiments of the present invention. The general computing architecture 400 can include various common computing elements, such as a computer 401, a network 414, and one or more remote computers 416. The computer 401 may be a server, a desktop computer, a laptop computer, a tablet computer or a mobile computing device. The computer 401 may include a processor 402, a main memory 404 and a system bus. The processor 402 may feature one or more processing units that can operate independently of each other. The main memory 404 may include volatile devices, non-volatile devices, or other random access memory devices. The computer 401 may feature secondary storage 410, consisting of one or more removable and/or non-removable storage units. These units house an operating system that manages various applications on the computer 401. The secondary storage 410 may also be used to store software configured to implement the components of the embodiments disclosed herein, which may be executed as one or more applications under the operating system. The computer 401 may also include a communication device(s) 412 through which the computer communicates with other devices, such as one or more remote computers 416, over wired and/or wireless computer networks 414. The communication device(s) 412 may communicate over but not limited to Wi-Fi, Bluetooth, ultra-wide band technology, and mobile telephone networks. The computer 401 may also access network storage 418 through computer network 414. The network storage 418 may include a network-attached storage device or cloud-based storage. The operating system and/or software may be stored in network storage 418. The computer 401 may have various input device(s) 406 for example, keyboard, mouse, touch-screen, camera, microphone, or a sensor, output device(s)

408, for example, a display, speakers or a printer. Storage devices 410, the communication device(s) 412, input devices 406 and output devices 408 may be integrated within a computer system or connected through various computer input/output interface devices.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

What is claimed is:

1. A system for electronically communicating protected accessible data of a user to an authorized third party, wherein the system includes:

a user device associated with the user;

a processor including a memory, wherein the processor is communicatively connected with the user device through a network, wherein the processor executes a set of instructions stored in the memory to perform the following:

presenting, an interface on the user device, wherein the interface facilitates the user to provide the protected accessible data, wherein the protected accessible data includes a plurality of personal identification documents of the user, wherein the interface enables the user to define settings including duration of access, number of uses for each granted access code and potentially accessible protected accessible data;

receiving the protected accessible data of the user through the interface and storing the protected accessible data in a database;

generating an access code for each of the plurality of personal identification documents of the user;

receiving an access request for the protected accessible data of the user from the authorized third party for providing a plurality of services to the user;

enabling the user to select the plurality of personal identification documents by checking boxes corresponding to the plurality of personal identification documents for viewing by the authorized third party; and enabling the user to provide the access code corresponding to the selected personal identification document facilitating the authorized third party to access the selected personal identification document through the user device, wherein the access code is limited by time and number of access uses, based on the settings selected by the user, wherein the system facilitates launching a digital vault storing the protected accessible data that can be accessed by the user from the user device, wherein the user grants access to the protected accessible data, upon launching the digital vault on the user device, to the authorized third party by selecting the plurality of personal identification documents and providing the access code corresponding to the selected personal identification documents, wherein the authorized third party is enabled to view only the selected personal identification documents of the user while preventing access to data that is not authorized, wherein after the selected personal identification documents are accessed by the authorized third party, the user device is reset and requires the user to authenticate before any features are available.

2. The system of claim 1, wherein the processor is further configured to register the user by creating a user profile and generating a unique identifier associated with the user.

3. The system of claim 2, wherein the processor is further configured to verify user identification information utilizing certificates associated with the unique identifier of the user.

4. The system of claim 3, wherein the processor is further configured to provide to the user and/or authorized third party, the plurality of services upon verification of the identification information using encryption, wherein access to the plurality of services is limited based on the user profile.

5. The system of claim 1, wherein the interface is customized based on a region associated with a location of the user, wherein the region determines a type of the protected accessible data to display for a respective third party.

6. The system of claim 1, wherein the processor is further configured to store a history of user transactions with the authorized third party in the database.

7. The system of claim 1, wherein the protected accessible data is stored in a cloud server, wherein the user device associated with the user is communicatively connected with the cloud server.

8. The system of claim 1, wherein the plurality of personal identification documents of the user includes, but is not limited to driver's license, motor vehicle insurance document, registration document of a motor vehicle, passport or travel visas, domestic or international travel documents, immunization records, identity verification documents, voter registration document, health insurance document, age verification documents and rental contracts.

9. A method for electronically communicating protected accessible data of a user to an authorized third party, wherein the method includes:

presenting an interface on a user device that facilitates the user to provide the protected accessible data, wherein the protected accessible data includes a plurality of personal identification documents of the user, wherein the interface enables the user to define settings including duration of access, number of uses for each granted access code and potentially accessible protected accessible data;

receiving the protected accessible data of the user through an interface and storing the protected accessible data in a database;

generating an access code for each of the plurality of personal identification documents of the user;

receiving an access request for the protected accessible data of the user from authorized third party for providing a plurality of services to the user;

enabling the user to select the plurality of personal identification documents by checking boxes corresponding to the plurality of personal identification documents for viewing by the authorized third party; and enabling the user to provide the access code corresponding to the selected personal identification document facilitating the authorized third party to access the selected personal identification document through the user device, wherein the access code is limited by time and number of access uses, based on the settings selected by the user, wherein the system facilitates launching a digital vault storing the protected accessible data that can be accessed by the user from the user device, wherein the user grants access to the protected accessible data, upon launching the digital vault on the user device, to the authorized third party by selecting the plurality of personal identification documents and providing the access code corresponding to the selected personal identification documents, wherein the authorized third party is enabled to view only the selected personal identification documents of the user while preventing access to data that is not authorized, wherein after the selected personal identification documents are accessed by the authorized third party, the user device is reset and requires the user to authenticate before any features are available.

10. The method of claim 9, wherein the method further includes registering the user by creating a user profile and generating a unique identifier associated with the user.

11. The method of claim 10, wherein the method further includes verifying user identification information utilizing certificates associated with the unique identifier of the user.

12. The method of claim 11, wherein the method further includes providing to the user and/or authorized third party, the plurality of services upon verification of the identification information using encryption, wherein access to the plurality of services is limited based on the user profile.

13. The method of claim 9, wherein the interface is customized based on a region associated with a location of the user, wherein the region determines a type of the protected accessible data to display in the interface for a respective third party.

14. The method of claim 9, wherein the method further includes storing a history of user transactions with the authorized third party in the database.

15. The method of claim 9, wherein the protected accessible data is stored in a cloud server or in a local storage, wherein the user device associated with the user is communicatively connected with the cloud server and the local storage.

16. The method of claim 9, wherein the plurality of personal identification documents of the user includes, but is not limited to driver's license, motor vehicle insurance document, registration document of a motor vehicle, passport or travel visas, domestic or international travel documents, immunization records, identity verification documents, voter registration document, health insurance document, age verification documents and rental contracts.

17. One or more non-transitory computer-readable storage mediums for electronically communicating protected accessible user data to an authorized third party, the one or more non-transitory computer-readable storage mediums storing computer-executable instructions for controlling one or more computing systems to:

present an interface on a user device that facilitates the user to provide the protected accessible data, wherein the protected accessible data includes a plurality of personal identification documents of the user, wherein the interface enables the user to define settings including duration of access, number of uses for each granted access code and potentially accessible protected accessible data;

receive the protected accessible data of the user through the interface and store the protected accessible data in a database;

generate an access code for each of the plurality of personal identification documents of the user;

receive an access request for the protected accessible data of the user from the authorized third party for providing a plurality of services to the user;

enable the user to select the plurality of personal identification documents by checking boxes corresponding to the plurality of personal identification documents for viewing by the authorized third party; and enable the user to provide the access code corresponding to the selected personal identification document facilitating the authorized third party to access the selected personal identification document through the user device, wherein the access code is limited by time and number of access uses, based on the settings selected by the user, wherein the system facilitates launching a digital vault storing the protected accessible data that can be accessed by the user from the user device, wherein the user grants access to the protected accessible data, upon launching the digital vault on the user device, to the authorized third party by selecting the plurality of personal identification documents and providing the access code corresponding to the selected personal identification documents, wherein the authorized third party is enabled to view only the selected personal identification documents of the user while preventing access to data that is not authorized, wherein after the selected personal identification documents are accessed by the authorized third party, the user device is reset and requires the user to authenticate before any features are available.

* * * * *